United States Patent
Bai

(10) Patent No.: US 10,834,424 B2
(45) Date of Patent: Nov. 10, 2020

(54) METHOD AND DEVICE FOR COMPRESSING IMAGE, AND ELECTRONIC DEVICE

(71) Applicant: BEIJING KINGSOFT INTERNET SECURITY SOFTWARE CO., LTD., Beijing (CN)

(72) Inventor: Bin Bai, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 43 days.

(21) Appl. No.: 16/037,704

(22) Filed: Jul. 17, 2018

(65) Prior Publication Data

US 2018/0324459 A1    Nov. 8, 2018

Related U.S. Application Data

(63) Continuation of application No. PCT/CN2017/081929, filed on Apr. 25, 2017.

(30) Foreign Application Priority Data

May 27, 2016  (CN) .......................... 2016 1 0366178

(51) Int. Cl.
*H04N 7/12* (2006.01)
*H04N 19/59* (2014.01)
(Continued)

(52) U.S. Cl.
CPC .............. *H04N 19/59* (2014.11); *G06F 3/14* (2013.01); *G06F 16/1727* (2019.01);
(Continued)

(58) Field of Classification Search
CPC ... G06F 3/0488; G06F 3/0485; G06F 3/04845
See application file for complete search history.

(56) References Cited

U.S. PATENT DOCUMENTS

| 6,052,692 A * | 4/2000 | Anderson ............ H04N 1/2112 |
| 2004/0090539 A1* | 5/2004 | Kim ....................... H04N 5/772 348/231.1 |

(Continued)

FOREIGN PATENT DOCUMENTS

| CN | 102543045 A | 7/2012 |
| CN | 103647916 A | 3/2014 |

(Continued)

OTHER PUBLICATIONS

International Search Report issued in corresponding International Application No. PCT/CN2017/081929 dated Jul. 21, 2017 (3 pages).
Office Action issued in corresponding Chinese Application No. 201610366178.7 dated May 17, 2018, and English translation thereof (17 pages).

*Primary Examiner* — Peet Dhillon
(74) *Attorney, Agent, or Firm* — Osha Liang LLP

(57) ABSTRACT

The present disclosure provides a method and a device for compressing an image, and an electronic device. The method includes: acquiring a resolution of the display screen and a resolution of an image to be compressed; detecting whether the resolution of the image to be compressed is greater than the resolution of the display screen; and when the resolution of the image to be compressed is greater than the resolution of the display screen, compressing the resolution of the image to be compressed to a target resolution according to the resolution of the display screen, a difference between the target resolution and the resolution of the display screen being within a preset resolution range.

17 Claims, 4 Drawing Sheets

(51) Int. Cl.
  *G06F 16/17*    (2019.01)
  *H04N 19/164*   (2014.01)
  *H04N 19/177*   (2014.01)
  *G06F 3/14*     (2006.01)
  *H04N 19/132*   (2014.01)
  *G09G 5/373*    (2006.01)
  *H04N 19/182*   (2014.01)

(52) U.S. Cl.
  CPC ........... *G09G 5/373* (2013.01); *H04N 19/132* (2014.11); *H04N 19/164* (2014.11); *H04N 19/177* (2014.11); *H04N 19/182* (2014.11); *G09G 2340/02* (2013.01); *G09G 2340/0407* (2013.01)

(56) References Cited

U.S. PATENT DOCUMENTS

2008/0037880 A1* 2/2008 Lai ................. H04N 19/172
                                              382/232
2011/0292222 A1* 12/2011 Klein ................. G11B 27/00
                                              348/207.1
2013/0033448 A1* 2/2013 Yano ................. G06F 3/04883
                                              345/173

FOREIGN PATENT DOCUMENTS

| CN | 104133649 A | 11/2014 |
|----|-------------|---------|
| CN | 105787868 A | 7/2016  |
| CN | 105872542 A | 8/2016  |
| CN | 106060382 A | 10/2016 |

* cited by examiner

METHOD AND DEVICE FOR COMPRESSING IMAGE, AND ELECTRONIC DEVICE

CROSS-REFERENCE TO RELATED APPLICATIONS

This application is a continuation application of International Application No. PCT/CN 2017/081929, which claims priority to and benefits of Chinese Patent Application Serial No. 201610366178.7, entitled as "Method and Device for Video Compression and Electronic Device", and filed on May 27, 2016 by BEIJING KINGSOFT INTERNET SECURITY SOFTWARE CO., LTD.

FIELD

The present disclosure relates the field of electronic technology, and more particularly, to a method and a device for compressing an image, and an electronic device.

BACKGROUND

With the rapid development of electronic technology and the popularization of electronic devices, functions of electronic devices are increasingly improved. For example, users may use electronic devices to store audio files, video files and photos for recording life. However, since the storage space of the electronic device is limited, when there is a large amount of content stored in the electronic device, it may be unable to continue storing because of shortage of the storage space. By storing video files in an electronic device as an example, in practical applications, it is found that, since the video files are composed of pictures, text and audio, the storage space occupied by video files is much greater than that occupied by simple texts. Therefore, in order to make reasonable use of the storage space of the electronic device, it is important to reasonably adjust the storage space occupied by video files.

Currently, in order to make reasonable use of the storage space of electronic devices, the video files are compressed and processed. However, in an actual compression process, it is found that, when the compressed video file is too small, the display quality of the video picture may be extremely poor, and when the compression processing is not enough, it may not save much storage space. Thus, it is important to determine compression degree of video files.

SUMMARY

According to a first aspect, embodiments of the present disclosure provide a method for compressing an image, which is applicable in an electronic device with a display screen. The method includes: acquiring a resolution of the display screen and a resolution of an image to be compressed; detecting whether the resolution of the image to be compressed is greater than the resolution of the display screen; and when the resolution of the image to be compressed is greater than the resolution of the display screen, compressing the resolution of the image to be compressed to a target resolution according to the resolution of the display screen, a difference between the target resolution and the resolution of the display screen being within a preset resolution range.

According to a second aspect, embodiments of the present disclosure provide a device for compressing an image. The device is disposed on an electronic device, and the electronic device is configured with a display screen. The device includes: an acquiring module, configured to acquire a resolution of the display screen and a resolution of an image to be compressed; a detecting module, configured to detect whether the resolution of the image to be compressed is greater than the resolution of the display screen; and a compressing module, configured to compress the resolution of the image to be compressed to a target resolution according to the resolution of the display screen when the resolution of the image to be compressed is greater than the resolution of the display screen, a difference between the target resolution and the resolution of the display screen being within a preset resolution range.

According to a third aspect, embodiments of the present disclosure provide an electronic device. The electronic device includes a housing, a processor, a memory, a display screen, a circuit board and a power supply circuit. The circuit board is disposed in a space enclosed by the housing. The processor and the memory are positioned on the circuit board. The display screen is externally embedded on the housing and connected with the circuit board. The power supply circuit is configured to provide power for respective circuits or components of the electronic device. The memory is configured to store executable program codes and data. The processor is configured to run a program corresponding to the executable program codes by reading the executable program codes stored in the memory, to perform following operations: acquiring a resolution of the display screen and a resolution of an image to be compressed; detecting whether the resolution of the image to be compressed is greater than the resolution of the display screen; and when the resolution of the image to be compressed is greater than the resolution of the display screen, compressing the resolution of the image to be compressed to a target resolution according to the resolution of the display screen, a difference between the target resolution and the resolution of the display screen being within a preset resolution range.

According to a fourth aspect, embodiments of the present disclosure provide a non-transitory computer-readable storage medium. The computer-readable storage medium is configured to store one or more programs that, when executed by a device, cause the device to perform operations of: acquiring a resolution of the display screen and a resolution of an image to be compressed; detecting whether the resolution of the image to be compressed is greater than the resolution of the display screen; and when the resolution of the image to be compressed is greater than the resolution of the display screen, compressing the resolution of the image to be compressed to a target resolution according to the resolution of the display screen, a difference between the target resolution and the resolution of the display screen being within a preset resolution range.

BRIEF DESCRIPTION OF THE DRAWINGS

The drawings of one or more embodiments will be briefly described below. Obviously, the drawings in the following descriptions only illustrate a part of the embodiments of the present disclosure, and for those skilled in the art, other drawings may be obtained according to these drawings without creative labor.

DETAILED DESCRIPTION

The technical solutions in the embodiments of the present disclosure will be described below with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

Embodiments of the present disclosure provide a method and a device for compressing an image, and an electronic device. In embodiments of the present disclosure, the electronic device may compress a resolution of an image to be compressed to a target resolution according to a resolution of the display screen, and a difference between the target resolution and the resolution of the display screen is within a preset resolution range, so as to avoid situations that the display quality of the image to be compressed is poor when the compressed image to be compressed is too small, and that less storage space is saved when the compression degree is not enough. Thus, by implementing embodiments of the present disclosure, the compression degree of the image to be compressed may accurately be determined. Detailed descriptions are as follows.

Figure 1:
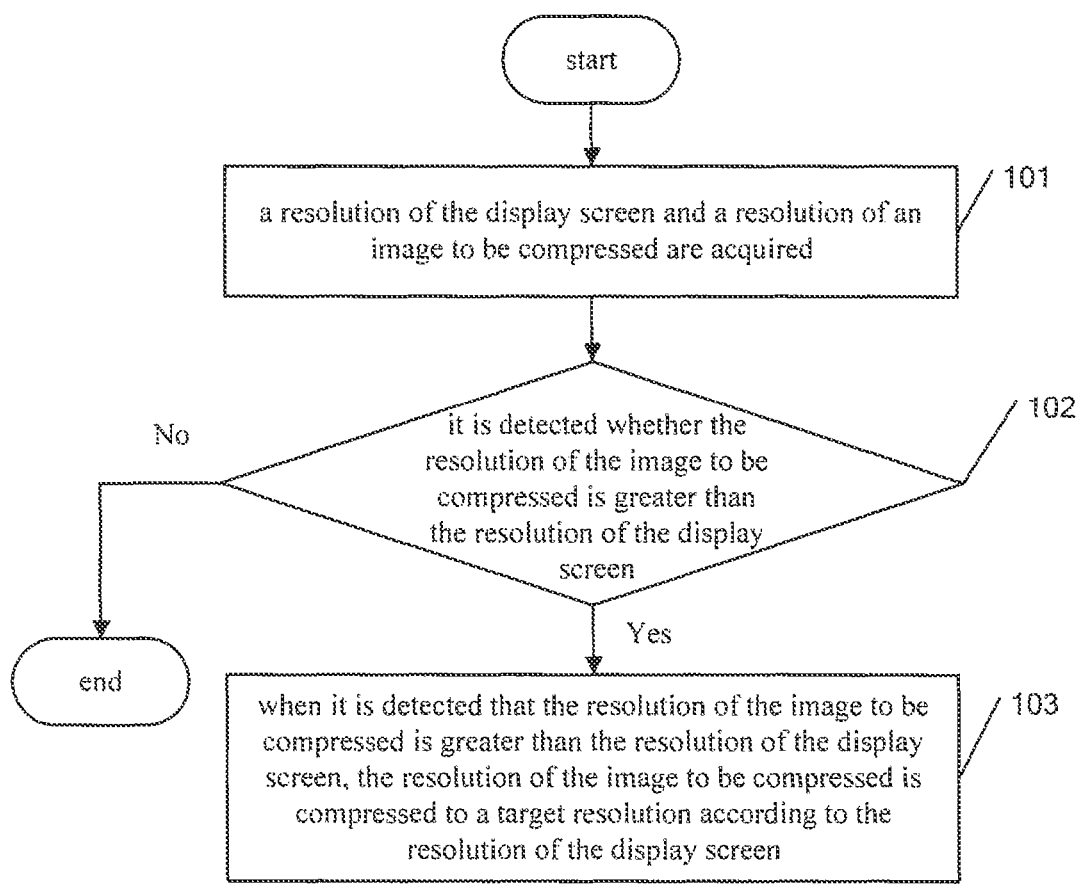
FIG. 1 is a flow chart of a method for compressing an image according to an embodiment of the present disclosure.

Referring to FIG. 1, which is a flow chart of a method for compressing an image according to an embodiment of the present disclosure. The method for compressing an image illustrated in FIG. 1 may be applicable in electronic devices with display screens such as smart phones (e.g., Android phones, iOS phones, etc.), tablet computers, palmtop computers, mobile internet devices (MIDs), etc. The image in the embodiments of the present disclosure may be a video, a picture, a graphic, or the like. As illustrated in FIG. 1, the method for compressing an image may include followings.

At block 101, a resolution of the display screen and a resolution of an image to be compressed are acquired.

In embodiments of the present disclosure, the display screen of the electronic device is a screen configured to display contents that the electronic device needs to display. The display contents may include, but are not limited to, text, pictures, symbols, and the like. The size of the display screen of the electronic device may be fixed, and the size of a display area for displaying contents may be adjustable. When the size of the display area is adjusted, it may be adjusted by the user according to needs, or may be adjusted by the electronic device according to user's historical adjustment records, or may be adjusted by the electronic device according to information of contents to be displayed (such as the size of the content to be displayed, the storage space occupied by the content to be displayed, etc.), or may also be adjusted by the electronic device according to hardware information of the electronic device (such as battery information of the electronic device, the resolution of the display screen of the electronic device, etc.), which is not limited in embodiments of the present disclosure. By implementing embodiments of the present disclosure, energy consumption of the electronic device may be reduced to some extent, and utilization of power consumption may be improved.

In embodiments of the present disclosure, the resolution of the display screen of the electronic device refers to the number of pixels displayed per unit area on the display screen of the electronic device, measured in horizontal and vertical pixels. When the resolution of the display screen of the electronic device is low, such as 640×480, there are fewer pixels displayed on the display screen of the electronic device. When the resolution of the display screen of the electronic device is high, such as 1500×1200, there are more pixels displayed on the display screen of the electronic device. For example, the resolution of the display screen of the electronic device being 1500×1200 means that there are 1500 pixels in the horizontal direction and 1200 pixels in the vertical direction. When the size of the display screen of the electronic device is the same, the higher the resolution of the display screen is, the finer and more delicate the display effect is. For example, for display screens with the same sizes, the display effect of the display screen with the resolution of 1500×1200 is finer and more delicate than that of the display screen with the resolution of 640×480.

In embodiments of the present disclosure, the resolution of the image refers to width and height pixels of the image. The resolution of the image is a parameter configured to measure the amount of data in the image, usually expressed as pixels per inch. The resolution of an image A is 1500×1200, it refers to valid pixels in the horizontal direction and vertical direction. When the size of the display area is small, pixels per inch are high, the image looks clear. When the size of the display area is large, since there are not many valid pixels to fill the display area, pixels per inch of valid pixels are reduced, the image is blurred.

At block 102, it is detected whether the resolution of the image to be compressed is greater than the resolution of the display screen.

In embodiments of the present disclosure, after the electronic device acquires the resolution of the display screen and the resolution of an image to be compressed, the electronic device may detect whether the resolution of the image to be compressed is greater than the resolution of the display screen, to obtain a detection result.

At block 103, when it is detected that the resolution of the image to be compressed is greater than the resolution of the display screen, the resolution of the image to be compressed is compressed to a target resolution according to the resolution of the display screen. A difference between the target resolution and the resolution of the display screen is within a preset resolution range.

In embodiments of the present disclosure, the difference between the resolution of the compressed image to be compressed and the resolution of the display screen is within the preset resolution range, and the smaller the preset resolution range is, the better the display quality of the image is. When the difference between the target resolution and the resolution of the display screen is zero (i.e., the resolution of the display screen is the same as the resolution of the image to be compressed), the display effect of the image to be compressed on the display screen is the best, this is because even if the resolution of the image to be compressed is adjusted to a higher value, the display effect of the image to be compressed on the display screen may not change. Therefore, when the electronic device detects that the resolution of the image to be compressed is greater than that of the display screen, the electronic device may compress the resolution of the image to be compressed to the target resolution according to the resolution of the display screen, and the difference between the target resolution and the resolution of the display screen is within the preset resolution range.

For example, when the resolution of the display screen of the electronic device is 720×1280, and the resolution of the image to be compressed is 1080×1920, the resolution 1080× 1920 of the image to be compressed may be compressed to 720×1280. The compression processing may save a storage space of 180 MB, and the display quality may not be affected when the image to be compressed is displayed on the display screen of the electronic device.

In FIG. 1, it is described in detail that the electronic device acquires the resolution of the display screen and the resolution of the image to be compressed, detects whether the resolution of the image to be compressed is greater than the resolution of the display screen, and when the resolution of the image to be compressed is greater than the resolution of the display screen, compresses the resolution of the image to be compressed to the target resolution according to the resolution of the display screen, the difference between the target resolution and the resolution of the display screen is within the preset resolution range. In embodiments of the present disclosure, the electronic device may compress the resolution of the image to be compressed to the target resolution according to the resolution of the display screen, and the difference between the target resolution and the resolution of the display screen is within the preset resolution range, so as to avoid problems that the display quality of the image to be compressed is poor when the compressed image to be compressed is too small, and that less storage space is saved when the compression degree is not enough. Thus, by implementing embodiments of the present disclosure, the compression degree of the image to be compressed may accurately be determined.

Figure 2:
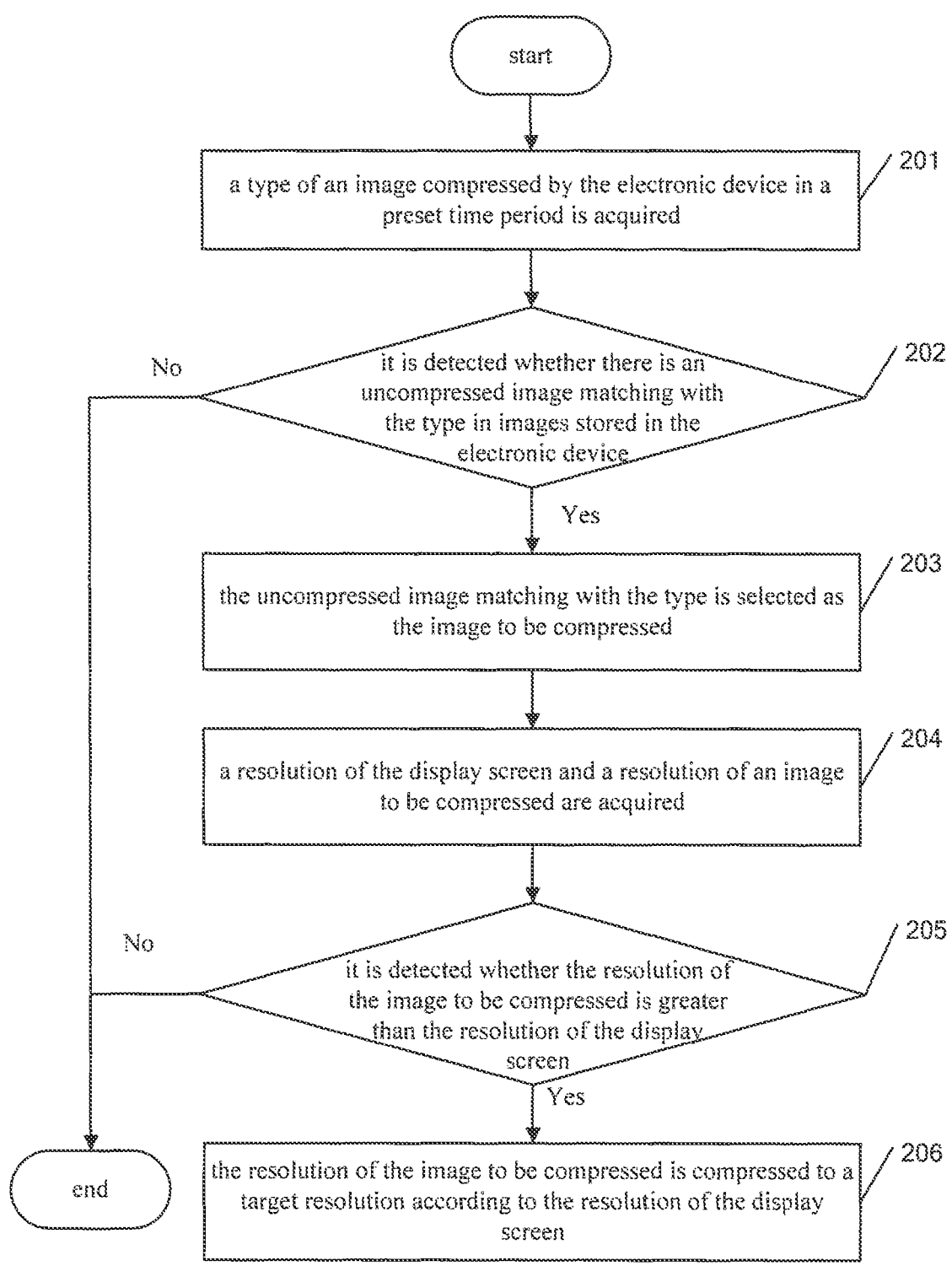
FIG. 2 is a flow chart of a method for compressing an image according to another embodiment of the present disclosure.

Referring to FIG. 2, which is a flow chart of a method for compressing an image according to another embodiment of the present disclosure. As illustrated in FIG. 2, the method for compressing an image may include followings.

At block 201, a type of an image compressed by the electronic device in a preset time period is acquired.

In embodiments of the present disclosure, the length of the preset time period may be set by the user according to needs, or may be set by the electronic device according to user's history setting records, such as one month, two months, three months, etc, which is not limited in embodiments of the present disclosure.

In embodiments of the present disclosure, the image may be a video, a picture, a graphic, or the like. The type of the image may include, but is not limited to, a landscape type, a character type, a building type, or the like.

In embodiments of the present disclosure, the electronic device may acquire the type of the image compressed by the electronic device in the preset time period, and determine user's preference habits in the compression process according to the type of the image compressed by the electronic device in the preset time period, and determine the image to be compressed according to user's preference habits, which may better match user's habits and improve user experience.

At block 202, it is detected whether there is an uncompressed image matching with the type in images stored in the electronic device.

In embodiments of the present disclosure, after the electronic device acquires the type of the image compressed by the electronic device in the preset time period, the electronic device may detect whether there is an uncompressed image matching with the type in images stored in the electronic device. For example, when the electronic device acquires that the type of the file compressed by the electronic device in the preset time period is mainly a landscape type, the electronic device may continue to detect whether there is the uncompressed image matching with the landscape type in files stored in the electronic device.

At block 203, when it is detected that there is the uncompressed image matching with the type in the images stored in the electronic device, the uncompressed image matching with the type is selected as the image to be compressed.

In embodiments of the present disclosure, when it is detected that there is the uncompressed image matching with the type in the images stored in the electronic device, it is indicated that there are still uncompressed images in the electronic device that need to be compressed, and then the electronic device may select the uncompressed image matching with the type as the image to be compressed of the electronic device. For example, when the electronic device acquires that the type of the image compressed by the electronic device in the preset time period is mainly the landscape type, and the electronic device detects that there is the uncompressed image matching with the landscape type in the files stored in the electronic device, then the electronic device may select the uncompressed image matching with the landscape type as the image to be compressed.

Furthermore, since the storage space of the electronic device is limited, the electronic device may continue to perform followings.

11) A remaining storage space of the electronic device is acquired.

12) It is detected whether the remaining storage space is less than a preset storage space threshold.

Acquiring the resolution of the display screen and the resolution of the image to be compressed includes acquiring the resolution of the display screen and the resolution of the image to be compressed when the remaining storage space is less than the preset storage space threshold.

In embodiments of the present disclosure, a preset storage space threshold may be set in electronic device in advance. The preset storage space threshold may be set by the user according to needs, or may be set by the electronic device according to the user's history setting records, or may be set by the electronic device according to user's total storage space, or may also be set by the electronic device according to electronic device's available storage space, which is not limited in embodiments of the present disclosure. By implementing embodiments of the present disclosure, setting manners of the preset storage space threshold may be increased, such that the preset storage space threshold may be set more reasonable, thereby improving user experience.

In embodiments of the present disclosure, the electronic device may obtain the remaining storage space of the electronic device in real time, and detect whether the remaining storage space value is less than the preset storage space threshold. When it is detected that the remaining storage space is less than the preset storage space threshold, it is indicated that the current storage space of the electronic device is small, the resolution of the display screen and the resolution of the image to be compressed may be obtained, and the image to be compressed may be compressed, so as to save the storage space.

At block 204, a resolution of the display screen and a resolution of an image to be compressed are acquired.

At block 205, it is detected whether the resolution of the image to be compressed is greater than the resolution of the display screen.

At block 206, when it is detected that the resolution of the image to be compressed is greater than the resolution of the display screen, the resolution of the image to be compressed is compressed to a target resolution according to the resolution of the display screen. A difference between the target resolution and the resolution of the display screen is within a preset resolution range.

In embodiments of the present disclosure, when the resolution of the display screen is the same as the resolution of the compressed image to be compressed, the display effect of the image to be compressed on the display screen is the best. Therefore, even if the resolution of the image to be compressed is adjusted to a higher value, the display effect of the image to be compressed on the display screen will not change. Therefore, when the electronic device detects that the resolution of the image to be compressed is greater than that of the display screen, the electronic device may compress the resolution of the image to be compressed to the target resolution according to the resolution of the display screen, and the difference between the target resolution and the resolution of the display screen is within the preset resolution range. Therefore, in order to ensure the display effect while reducing the storage space occupied by the image to be compressed, the electronic device may continue to perform followings.

21) A touch operation input by a user on a touch screen of the electronic device is detected.

22) It is detected whether a touch parameter of the touch operation is matched with a preset parameter for triggering the electronic device to compress the image to be compressed.

23) When it is detected that the touch parameter of the touch operation is matched with the preset parameter for triggering the electronic device to compress the image to be compressed, the resolution of the image to be compressed is compressed to the target resolution according to the resolution of the display screen is performed.

In embodiments of the present disclosure, when it is detected that the resolution of the image to be compressed is greater than that of the display screen, the electronic device may output a prompt message for prompting to compress the image to be compressed, and may detect the touch operation outputted by the user on the touch screen of the electronic device for the prompt message. The touch operation may include, but is not limited to, one or more of a slide operation, a click operation, and a press operation.

In embodiments of the present disclosure, the touch parameter of the touch operation may include, but is not limited to, a touch track, a touch direction, a touch force, a touch frequency, a time interval between every two touch operations, etc.

In embodiments of the present disclosure, the parameter for triggering the electronic device to compress the image to be compressed may be preset in the electronic device. The parameter for triggering the electronic device to compress the image to be compressed may be set by the user according to needs, or may be set by the electronic device according to user's history setting records, or may be set by the electronic device according to touch parameters of user's history touch operations, which is not limited in embodiments of the present disclosure.

The operation of the electronic device setting the parameter for triggering the electronic device to compress the image to be compressed according to touch parameters of user's history touch operations may include followings.

31) A touch parameter of a touch operation input by a user detected in a preset time period is acquired.

32) The parameter for triggering the electronic device to compress the image to be compressed is set according to the touch parameter of the touch operation input by the user detected in the preset time period.

For example, when the touch parameter of the touch operation input by the user detected in the preset time period is a touch pressure value, an average value of the touch pressure value of the touch operation in the preset time period may be calculated, and parameter for triggering the electronic device to compress the image to be compressed may be set according to the touch pressure value of the touch operation input by the user detected in the preset time period. In detail, when it is calculated that the average value of the touch pressure value of the touch operation in the preset time period is 0.5N, the parameter for triggering the electronic device to compress the image to be compressed may be set to $(0.5-n)N$ to $(0.5+n)N$, where n is a real number.

As an alternative implementation, the electronic device compressing the resolution of the image to be compressed to the target resolution according to the resolution of the display screen includes compressing the image to be compressed by using the resolution of the display screen as the target resolution.

In embodiments of the present disclosure, the electronic device may compress the resolution of the image to be compressed to the resolution of the display screen by using the resolution of the display screen as the target resolution, and compress the image to be compressed. For example, when the resolution of the display screen of the electronic device is 720×1280, the resolution of the image to be compressed is 1080×1920, and then when the image to be compressed is compressed, 720×1280 may be taken as the target resolution, the resolution 1080×1920 of the image to be compressed may be compressed to 720×1280. The compression processing may save a storage space of 180 MB, and the display quality will not be affected when the image to be compressed is displayed on the display screen of the electronic device. In the compression process, the compression method may include, but is not limited to, a Huffman compression method, a linear prediction encoding method, a lossless compression encoding method, and the like.

Furthermore, after the electronic device compresses the resolution of the image to be compressed to the target resolution according to the resolution of the display screen, the compressed image may be stored and the image to be compressed may be deleted.

In embodiments of the present disclosure, after the electronic device compresses the resolution of the image to be compressed to the target resolution according to the resolution of the display screen, since the difference between the target resolution and the resolution of the display screen is within the preset resolution range, thus it may avoid problems that the compressed image to be compressed is too small, the display quality of the image to be compressed is extremely poor, or the compression degree is not enough in the compression process, less storage space is saved. In order to allow the user to view the compressed image at next viewing, the electronic device may store the compressed image in the electronic device, and in order to further save the storage space, the image to be compressed may be deleted from the electronic device.

In FIG. 2, it is described in detail that the electronic device may compress the image to be compressed by using the resolution of the display screen as the target resolution. When the resolution of the image to be compressed is compressed to the resolution of the display screen, the display effect of the image to be compressed on the electronic device is the best. Thus, by implementing embodiments of the present disclosure, the compression degree of the image to be compressed may accurately be determined, and the display effect of the image to be compressed may be improved.

Figure 3:
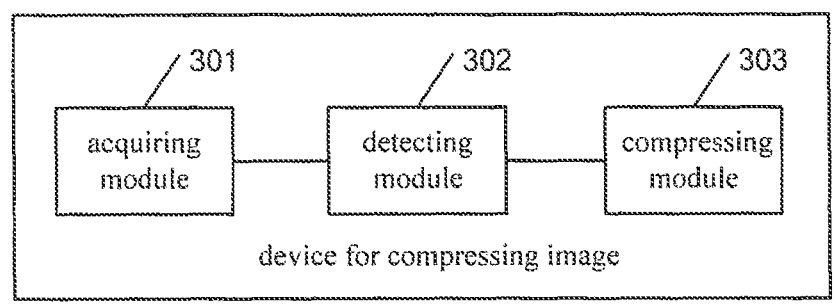
FIG. 3 is a block diagram of a device for compressing an image according to an embodiment of the present disclosure.

Referring to FIG. 3, which is a block diagram of a device for compressing an image according to an embodiment of the present disclosure. The device is configured to perform the above method for compressing an image. The device for compressing an image may be disposed on an electronic device with a display screen. The image in the embodiments of the present disclosure may be a video, a picture, a graphic, or the like. As illustrated in FIG. 3, the device for compressing an image may include an acquiring module 301, a detecting module 302 and a compressing module 303.

The acquiring module 301 is configured to acquire a resolution of the display screen and a resolution of an image to be compressed.

In embodiments of the present disclosure, the display screen of the electronic device is a screen configured to display contents that the electronic device needs to display. The display contents may include, but are not limited to, text, pictures, symbols, and the like. The size of the display screen of the electronic device may be fixed, and the size of a display area for displaying contents may be adjustable. When the size of the display area is adjusted, it may be adjusted by the user according to needs, or may be adjusted by the electronic device according to user's historical adjustment records, or may be adjusted by the electronic device according to information of contents to be displayed (such as the size of the content to be displayed, the storage space occupied by the content to be displayed, etc.), or may also be adjusted by the electronic device according to hardware information of the electronic device (such as battery information of the electronic device, the resolution of the display screen of the electronic device, etc.), which is not limited in embodiments of the present disclosure. By implementing embodiments of the present disclosure, function consumption of the electronic device may be reduced to some extent, and utilization of power consumption may be improved.

In embodiments of the present disclosure, the resolution of the display screen of the electronic device refers to the number of pixels displayed per unit area on the display screen of the electronic device, measured in horizontal and vertical pixels. When the resolution of the display screen of the electronic device is low, such as 640×480, there are few pixels displayed on the display screen of the electronic device. When the resolution of the display screen of the electronic device is high, such as 1500×1200, there are more pixels displayed on the display screen of the electronic device. For example, the resolution of the display screen of the electronic device being 1500×1200 means that there are 1500 pixels in the horizontal direction and 1200 pixels in the vertical direction. When the size of the display screen of the electronic device is the same, the higher the resolution of the display screen is, the finer and more delicate the display effect is. For example, for display screens with the same sizes, the display effect of the display screen with the resolution of 1500×1200 is finer and more delicate than that of the display screen with the resolution of 640×480.

In embodiments of the present disclosure, the resolution of the image refers to width and height pixels of the image. The resolution of the image is a parameter configured to measure the amount of data in the image, usually expressed as pixels per inch. The resolution of an image A is 1500×1200, it refers to valid pixels in the horizontal direction and vertical direction. When the size of the display area is small, pixels per inch are high, the image looks clear. When the size of the display area is large, since there are not many valid pixels to fill the display area, pixels per inch of valid pixels are reduced, the image is blurred.

The detecting module 302 is configured to detect whether the resolution of the image to be compressed is greater than the resolution of the display screen.

In embodiments of the present disclosure, after the acquiring module 301 acquires the resolution of the display screen and the resolution of an image to be compressed, the detecting module 302 may detect whether the resolution of the image to be compressed is greater than the resolution of the display screen, to obtain a detection result.

The compressing module 303 is configured to compress the resolution of the image to be compressed to a target resolution according to the resolution of the display screen when the detecting module 302 detects that the resolution of the image to be compressed is greater than the resolution of the display screen. A difference between the target resolution and the resolution of the display screen is within a preset resolution range.

In embodiments of the present disclosure, the difference between the resolution of the compressed image to be compressed and the resolution of the display screen is within the preset resolution range, and the smaller the preset resolution range is, the better the display quality of the image is. When the difference between the target resolution and the resolution of the display screen is zero (i.e., the resolution of the display screen is the same as the resolution of the image to be compressed), the display effect of the image to be compressed on the display screen is the best, this is because even if the resolution of the image to be compressed is adjusted to a higher value, the display effect of the image to be compressed on the display screen will not change. Therefore, when the detecting module 302 detects that the resolution of the image to be compressed is greater than that of the display screen, the compressing module 303 may compress the resolution of the image to be compressed to the target resolution according to the resolution of the display screen, and the difference between the target resolution and the resolution of the display screen is within the preset resolution range.

For example, when the resolution of the display screen of the electronic device is 720×1280, and the resolution of the image to be compressed is 1080×1920, the resolution 1080×1920 of the image to be compressed may be compressed to 720×1280. The compression processing may save a storage space of 180 MB, and the display quality will not be affected when the image to be compressed is displayed on the display screen of the electronic device.

In FIG. 3, it is described in detail that the acquiring module 301 acquires the resolution of the display screen and the resolution of the image to be compressed, the detecting module 302 detects whether the resolution of the image to be compressed is greater than the resolution of the display screen, and when the detecting module 302 detects that the resolution of the image to be compressed is greater than the resolution of the display screen, the compressing module 303 compresses the resolution of the image to be compressed to the target resolution according to the resolution of the display screen, the difference between the target resolution and the resolution of the display screen is within the preset resolution range. In embodiments of the present disclosure, the compressing module 303 may compress the resolution of the image to be compressed to the target resolution according to the resolution of the display screen, and the difference between the target resolution and the resolution of the display screen is within the preset resolution range, so as to avoid problems that the display quality of the image to be compressed is poor when the compressed image to be compressed is too small, and that less storage space is saved when the compression degree is not enough. Thus, by implementing embodiments of the present disclosure, the compression degree of the image to be compressed may accurately be determined.

Figure 4:
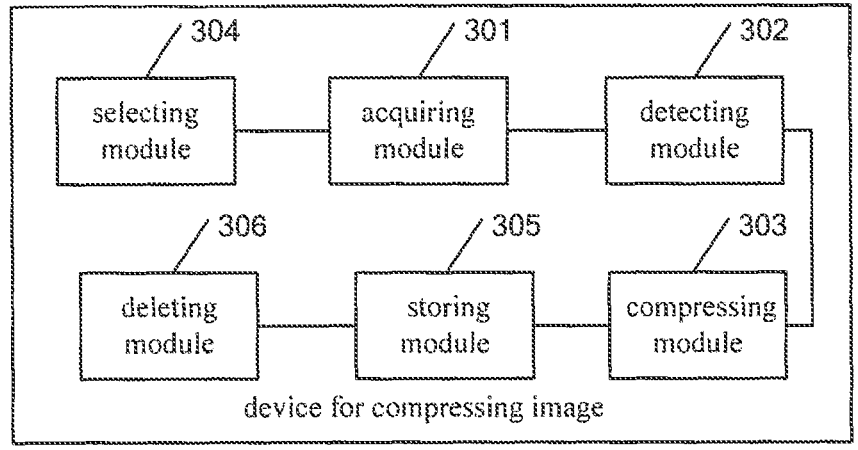
FIG. 4 is a block diagram of a device for compressing an image according to another embodiment of the present disclosure.

Referring to FIG. 4, which is a block diagram of a device for compressing an image according to another embodiment of the present disclosure. The device is configured to perform the above method for compressing an image. FIG. 4 is obtained on the basis of FIG. 3, and in addition to the modules illustrated in FIG. 3, the device further includes a selecting module 304, a storing module 305 and a deleting module 306.

The acquiring module 301 is further configured to acquire a type of an image compressed by the electronic device in a preset time period.

The detecting module 302 is further configured to detect whether there is an uncompressed image matching with the type in images stored in the electronic device.

The selecting module 304 is configured to select the uncompressed image matching with the type as the image to be compressed when the detecting module detects that there is the uncompressed image matching with the type in the images stored in the electronic device.

The acquiring module 301 is further configured to acquire a remaining storage space of the electronic device before the resolution of the display screen and the resolution of the image to be compressed are acquired.

The detecting module 302 is further configured to detect whether the remaining storage space is less than a preset storage space threshold.

The acquiring module 301 is configured to acquire the resolution of the display screen and the resolution of the image to be compressed by acts of: acquiring the resolution of the display screen and the resolution of the image to be compressed when the detecting module 302 detects that the remaining storage space is less than the preset storage space threshold.

The storing module 305 is configured to store the compressed image after the compressing module 303 compresses the image to be compressed by using the resolution of the display screen as the target resolution.

The deleting module 306 is configured to delete the image to be compressed.

The compressing module 303 is configured to compress the resolution of the image to be compressed to the target resolution according to the resolution of the display screen by acts of: compressing the image to be compressed by using the resolution of the display screen as the target resolution.

By implementing embodiments illustrated in FIG. 4, the compression degree of the image to be compressed may accurately be determined, so as to improve the display effect of the image to be compressed in the display process.

Figure 5:
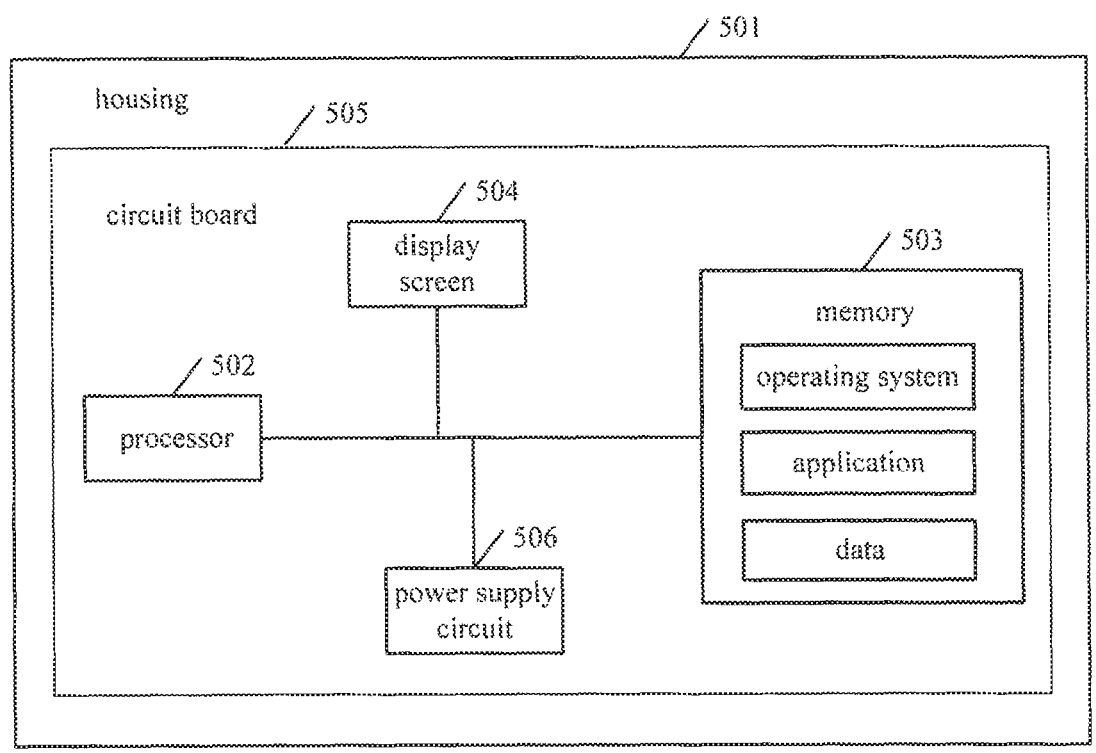
FIG. 5 is a block diagram of an electronic device according to an embodiment of the present disclosure.

Referring to FIG. 5, which is a schematic diagram of an electronic device according to an embodiment of the present disclosure. The electronic device is configured to perform the above method for compressing an image. As illustrated in FIG. 5, the electronic device includes a housing 501, a processor 502, a memory 503, a display screen 504, a circuit board 505 and a power supply circuit 506. The circuit board 505 is disposed in a space enclosed by the housing. The processor 502 and the memory 503 are positioned on the circuit board. The display screen 504 is externally embedded on the housing 501 and connected with the circuit board 505. It would be understood by those skilled in the art that, the structure of the electronic device shown in FIG. 5 does not constitute a limitation to embodiments of the present disclosure. It may be a bus structure or a star structure, and may also include more or less than illustrated components, or some components, or different component arrangements.

The processor 502 is a control center of the phone, which utilizes various interfaces and wires to connect various parts of the electronic device. By running or executing the software program and/or modules stored in the memory 503, and by calling data stored in the memory 503, the various functions and data processing of the electronic device may be executed. The processor 502 may be composed of an integrated circuit (IC), for example, may be composed of a single packaged IC, or may be composed of a plurality of packaged ICs having the same function or different functions. For example, the processor 502 may include only a Central Processing Unit (CPU), and may also be a combination of a CPU, a digital signal processor (DSP), a graphic processing unit (GPU), and various control chips. In the embodiment of the present disclosure, the CPU may be a single operation core or multiple operation cores.

The display screen 504 may include a touch panel, a touch screen, etc., which may be configured to output reminder messages, pictures, etc., and may also be configured to receive touch operations triggered by users.

The power supply circuit 506 is configured to provide power for respective circuits or components of the electronic device.

The memory 503 may be configured to store software programs and modules. The processor 502 is configured to perform various functions and data processing of the electronic device by calling software programs and modules stored in the memory 503. The memory 503 mainly includes a program storage area and a data storage area, in which the program storage area may store an operating system, an application required for at least one function, etc., the data storage area may store data created according to the use of the electronic device, etc. In embodiments of the present disclosure, the operating system may be an Android system, an iOS system, a Windows operating system, or the like.

In the electronic device illustrated in FIG. 5, the processor 502 is configured to call an application stored in the memory 503 to perform following operations: acquiring a resolution of the display screen and a resolution of an image to be compressed; detecting whether the resolution of the image to be compressed is greater than the resolution of the display screen; and when the resolution of the image to be compressed is greater than the resolution of the display screen, compressing the resolution of the image to be compressed to a target resolution according to the resolution of the display screen, a difference between the target resolution and the resolution of the display screen being within a preset resolution range.

As an alternative implementation, the processor 502 is configured to call the application stored in the memory 503 to perform the operation of compressing the resolution of the image to be compressed to the target resolution according to the resolution of the display screen, the difference between the target resolution and the resolution of the display screen being within the preset resolution range by acts of: compressing the image to be compressed by using the resolution of the display screen as the target resolution.

As another alternative implementation, after the processor 502 is configured to call the application stored in the memory 503 to perform the operation of compressing the image to be compressed by using the resolution of the display screen as the target resolution, the processor further performs an operation of: storing the compressed image, and deleting the image to be compressed.

As another alternative implementation, before the processor 502 is configured to call the application stored in the memory 503 to perform the operation of acquiring the resolution of the display screen and the resolution of the image to be compressed, the processor further performs operations of: acquiring a remaining storage space of the electronic device; and detecting whether the remaining storage space is less than a preset storage space threshold. Acquiring the resolution of the display screen and the resolution of the image to be compressed includes: acquiring the resolution of the display screen and the resolution of the image to be compressed when it is detected that the remaining storage space is less than a preset storage space threshold.

As another alternative implementation, the processor 502 is configured to call the application stored in the memory 503 to perform operations of: acquiring a type of an image compressed by the electronic device in a preset time period; detecting whether there is an uncompressed image matching with the type in images stored in the electronic device; and selecting the uncompressed image matching with the type as the image to be compressed when there is the uncompressed image matching with the type in the images stored in the electronic device.

In detail, the electronic device described in embodiments of the present disclosure may implement part or all flows of method for compressing an image described in FIG. 1 and FIG. 2.

The modules or sub-modules in embodiments of the present disclosure may be implemented by a general integrated circuit (such as a CPU), or by an Application Specific Integrated Circuit (ASIC).

The steps in the method of embodiments of the present disclosure may be adjusted, combined and deleted according to actual needs.

The units in the electronic device of embodiments of the present disclosure may be combined, divided and deleted according to actual needs.

It would be understood by those skilled in the art that, all or a part of the steps carried by the method in the above-described embodiments may be completed by relevant hardware instructed by a program. The program may be stored in a computer readable storage medium, such as ROM/RAM, a magnetic disk, an optical disk, or the like.

The foregoing descriptions are merely preferred embodiments of the present disclosure, and are not intended to limit protection scopes of the present disclosure. Any modification, equivalent replacement, improvement and the like made within the spirit and principle of the present disclosure should be included in the protection scopes of the present disclosure.

What is claimed is:

1. A method for compressing an image, applicable in an electronic device with a display screen, comprising:
    acquiring a resolution of the display screen and a resolution of the image to be compressed;
    detecting whether the resolution of the image to be compressed is greater than the resolution of the display screen;
    when the resolution of the image to be compressed is greater than the resolution of the display screen, compressing the resolution of the image to be compressed to a target resolution according to the resolution of the display screen, a difference between the target resolution and the resolution of the display screen being within a preset resolution range;
    acquiring a type of an image compressed by the electronic device in a preset time period;
    detecting whether there is an uncompressed image matching with the type in images stored in the electronic device; and
    selecting the uncompressed image matching with the type as the image to be compressed when there is the uncompressed image matching with the type in the images stored in the electronic device.

2. The method according to claim 1, wherein, compressing the resolution of the image to be compressed to the target resolution according to the resolution of the display screen, the difference between the target resolution and the resolution of the display screen being within the preset resolution range, comprises:
    compressing the image to be compressed by using the resolution of the display screen as the target resolution.

3. The method according to claim 1, wherein, after compressing the image to be compressed by using the resolution of the display screen as the target resolution, the method further comprises:
    storing the compressed image, and deleting the image to be compressed.

4. The method according to claim 1, wherein, before acquiring the resolution of the display screen and the resolution of the image to be compressed, the method further comprises:
    acquiring a remaining storage space of the electronic device; and
    detecting whether the remaining storage space is less than a preset storage space threshold;
    wherein acquiring the resolution of the display screen and the resolution of the image to be compressed comprises:
        acquiring the resolution of the display screen and the resolution of the image to be compressed when the remaining storage space is less than the preset storage space threshold.

5. A device for compressing an image, disposed on an electronic device configured with a display screen, comprising:
    a processor; and
    a memory, configured to store a computer program comprising program instructions;
    wherein the processor is configured to:
        acquire a resolution of the display screen and a resolution of the image to be compressed;
        detect whether the resolution of the image to be compressed is greater than the resolution of the display screen;
        compress the resolution of the image to be compressed to a target resolution according to the resolution of the display screen when the resolution of the image to be compressed is greater than the resolution of the display screen, a difference between the target resolution and the resolution of the display screen being within a preset resolution range;
        acquire a type of an image compressed by the electronic device in a preset time period;
        detect whether there is an uncompressed image matching with the type in images stored in the electronic device; and
        select the uncompressed image matching with the type as the image to be compressed when there is the uncompressed image matching with the type in the images stored in the electronic device.

6. The device according to claim 5, wherein the processor is configured to compress the resolution of the image to be compressed to the target resolution according to the resolution of the display screen by acts of:
compressing the image to be compressed by using the resolution of the display screen as the target resolution.

7. The device according to claim 5, wherein the processor is further configured to:
store the compressed image after the processor compresses the image to be compressed by using the resolution of the display screen as the target resolution; and
delete the image to be compressed.

8. The device according to claim 5, wherein the processor is further configured to:
acquire a remaining storage space of the electronic device before the processor acquires the resolution of the display screen and the resolution of the image to be compressed; and
detect whether the remaining storage space is less than a preset storage space threshold;
wherein the processor is configured to acquire the resolution of the display screen and the resolution of the image to be compressed by acts of:
acquiring the resolution of the display screen and the resolution of the image to be compressed when the remaining storage space is less than the preset storage space threshold.

9. An electronic device, comprising a housing, a processor, a memory, a display screen, a circuit board and a power supply circuit, wherein,
the circuit board is disposed in a space enclosed by the housing;
the processor and the memory are positioned on the circuit board;
the display screen is externally embedded on the housing and connected with the circuit board;
the power supply circuit is configured to provide power for respective circuits or components of the electronic device;
the memory is configured to store executable program codes and data;
the processor is configured to run a program corresponding to the executable program codes by reading the executable program codes stored in the memory, to perform following operations:
acquiring a resolution of the display screen and a resolution of an image to be compressed;
detecting whether the resolution of the image to be compressed is greater than the resolution of the display screen;
when the resolution of the image to be compressed is greater than the resolution of the display screen, compressing the resolution of the image to be compressed to a target resolution according to the resolution of the display screen, a difference between the target resolution and the resolution of the display screen being within a preset resolution range;
acquiring a type of an image compressed by the electronic device in a preset time period;
detecting whether there is an uncompressed image matching with the type in images stored in the electronic device; and
selecting the uncompressed image matching with the type as the image to be compressed when there is the uncompressed image matching with the type in the images stored in the electronic device.

10. The electronic device according to claim 9, wherein the processor is configured to run the program corresponding to the executable program codes by reading the executable program codes stored in the memory, to perform the operation of compressing the resolution of the image to be compressed to the target resolution according to the resolution of the display screen, the difference between the target resolution and the resolution of the display screen being within the preset resolution range by acts of:
compressing the image to be compressed by using the resolution of the display screen as the target resolution.

11. The electronic device according to claim 9, wherein after the processor is configured to run the program corresponding to the executable program codes by reading the executable program codes stored in the memory, to perform the operation of compressing the image to be compressed by using the resolution of the display screen as the target resolution, the processor further performs an operation of:
storing the compressed image, and deleting the image to be compressed.

12. The electronic device according to claim 9, wherein before the processor is configured to run the program corresponding to the executable program codes by reading the executable program codes stored in the memory, to perform the operation of acquiring the resolution of the display screen and the resolution of the image to be compressed, the processor further performs operations of:
acquiring a remaining storage space of the electronic device; and
detecting whether the remaining storage space is less than a preset storage space threshold;
wherein acquiring the resolution of the display screen and the resolution of the image to be compressed comprises:
acquiring the resolution of the display screen and the resolution of the image to be compressed when it is detected that the remaining storage space is less than a preset storage space threshold.

13. The method according to claim 1, wherein compressing the resolution of the image to be compressed to the target resolution according to the resolution of the display screen comprises:
detecting a touch operation input by a user on a touch screen of the electronic device;
detecting whether a touch parameter of the touch operation is matched with a preset parameter for triggering the electronic device to compress the image to be compressed; and
compressing the resolution of the image to be compressed to the target resolution according to the resolution of the display screen when the touch parameter of the touch operation is matched with the preset parameter for triggering the electronic device to compress the image to be compressed.

14. The method according to claim 13, wherein the touch operation comprises one or more of a slide operation, a click operation, and a press operation;
the touch parameter of the touch operation comprises a touch track, a touch direction, a touch force, a touch frequency, and a time interval between every two touch operations.

15. The device according to claim 5, wherein the processor is configured to compress the resolution of the image to be compressed to the target resolution according to the resolution of the display screen by acts of:

detect a touch operation input by a user on a touch screen of the electronic device;

detect whether a touch parameter of the touch operation is matched with a preset parameter for triggering the electronic device to compress the image to be compressed; and compress the resolution of the image to be compressed to the target resolution according to the resolution of the display screen when the touch parameter of the touch operation is matched with the preset parameter for triggering the electronic device to compress the image to be compressed.

16. The device according to claim 15, wherein the touch operation comprises one or more of a slide operation, a click operation, and a press operation;

the touch parameter of the touch operation comprises a touch track, a touch direction, a touch force, a touch frequency, and a time interval between every two touch operations.

17. The electronic device according to claim 9, wherein the processor is configured to run the program corresponding to the executable program codes by reading the executable program codes stored in the memory, to perform the operation of compressing the resolution of the image to be compressed to the target resolution according to the resolution of the display screen by acts of:

detecting a touch operation input by a user on a touch screen of the electronic device;

detecting whether a touch parameter of the touch operation is matched with a preset parameter for triggering the electronic device to compress the image to be compressed; and compressing the resolution of the image to be compressed to the target resolution according to the resolution of the display screen when the touch parameter of the touch operation is matched with the preset parameter for triggering the electronic device to compress the image to be compressed.

* * * * *